United States Patent [19]

Petroff

[11] 4,386,409
[45] May 31, 1983

[54] SEWAGE FLOW MONITORING SYSTEM

[76] Inventor: Alan M. Petroff, PH-2 Marbella del Caribe, Este, Isla Vorde, P.R. 00914

[21] Appl. No.: 190,036

[22] Filed: Sep. 23, 1980

[51] Int. Cl.³ ............................................. G01F 23/28
[52] U.S. Cl. .................. 364/510; 73/290 V; 367/108
[58] Field of Search ............ 364/510, 571; 73/290 V, 73/291; 367/108, 902, 908

[56] References Cited

U.S. PATENT DOCUMENTS

| | | | |
|---|---|---|---|
| 4,000,650 | 1/1977 | Snyder | 73/290 V |
| 4,070,563 | 1/1978 | Petroff | 364/510 |
| 4,114,441 | 9/1978 | Magri | 367/108 |
| 4,170,765 | 10/1979 | Austin et al. | 73/290 V |
| 4,202,211 | 5/1980 | Perry | 364/510 |
| 4,203,324 | 5/1980 | Baumoel | 367/908 |
| 4,221,004 | 9/1980 | Combs et al. | 73/290 V |

*Primary Examiner*—Gary Chin
*Attorney, Agent, or Firm*—C. A. Phillips

[57] ABSTRACT

A sewer flow monitoring system wherein the depth of fluid in a pipe is measured in pairs of transmitter-receiver ultrasonic ranging transducers. Each measurement sample is tested against a selected range criteria and against other samples, and the determined good samples are then averaged. Short range detection capability is obtained by varying the response of signal processing wherein an attenuating effect decreases with time following a transmitted pulse.

8 Claims, 3 Drawing Figures

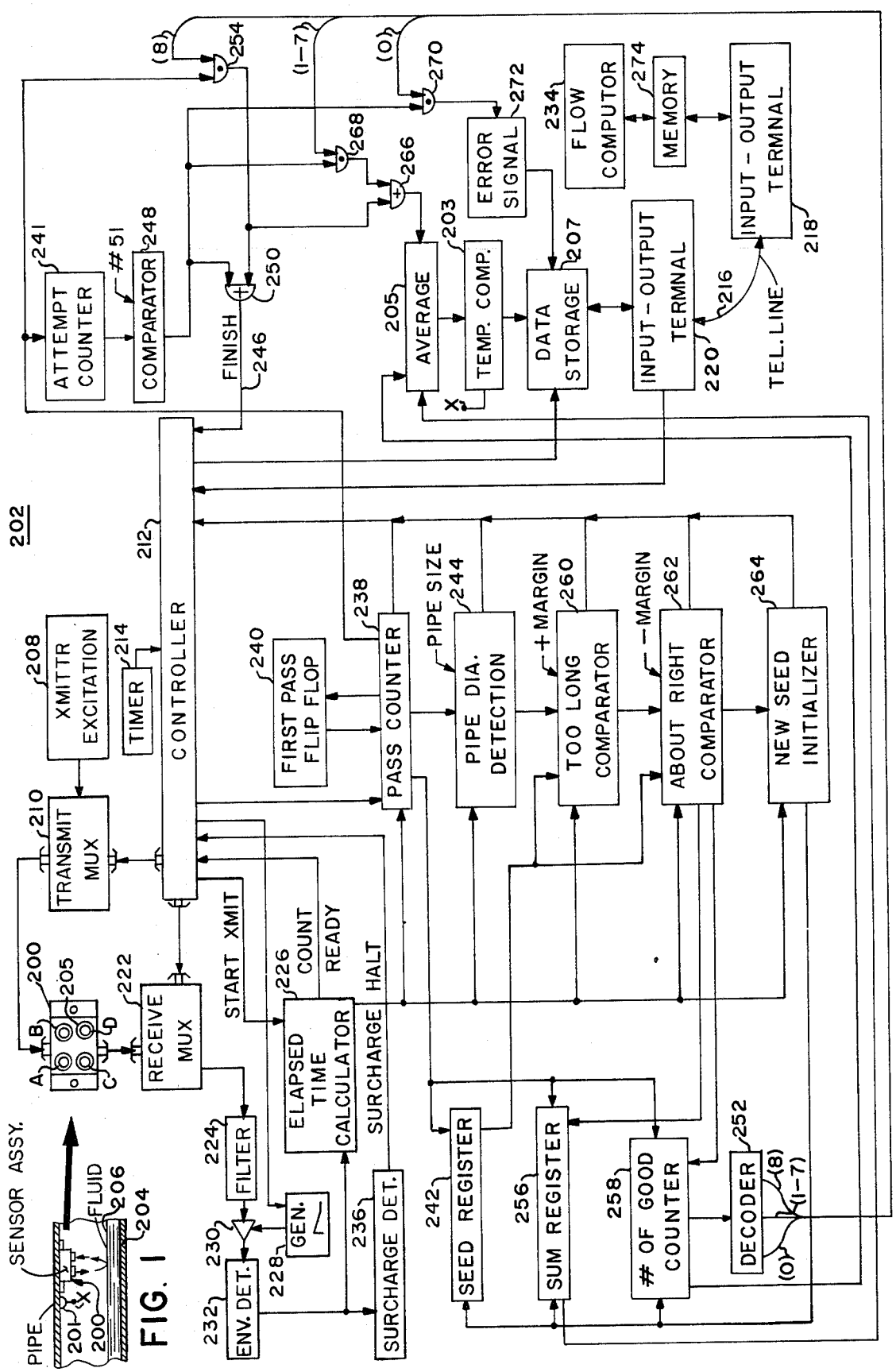

SEWAGE FLOW MONITORING SYSTEM

TECHNICAL FIELD

This invention relates to systems for measuring flow through sewer pipes, and particularly to a system of this category wherein less than full pipe measurements are to be encountered, and flow measurement is effected by the measurement of the level in a pipe.

BACKGROUND ART

U.S. Pat. No. 4,070,563 discloses what the applicant views as the most pertinent art to the present invention. It illustrates and describes a system of sewer flow monitoring wherein synchronized measurements of liquid level are made in pipes exiting into manholes, between which manholes flow in a pipe is to be measured. Prior approaches involved making liquid level measurements in the manholes. Because of non-uniformity of manholes and the lack of positive synchronization of measurements made at flow related manholes, the accuracy and reliability obtained was regarded by many as simply inadequate. In contrast, the system described in U.S. Pat. No. 4,070,563 has been widely heralded as superior and has been widely used during the past few years. In the patented system, liquid level measurements are precisely made within a pipe near its exit, these measurements being made by means of pressure sensing elements positioned in the bottom of the pipe. This type level measurement has proven quite successful as indicated. However, because of the environment, the pressure sensors being immersed in sewer fluid and sludge, it has been deemed desirable to provide a more durable system, one that could be located out of the sewage. With this in mind, a likely approach would be to employ sonic or ultrasonic type devices, such being rather widely used in the measurement of liquid levels in manholes in accordance with the prior art referred to above.

Typically in manhole liquid level measurement systems, sound transducers (one for transmission and one for reception, or a single transducer functioning as both transmitter and receiver) are typically positioned in the top region of a manhole well above anticipated liquid levels. A burst of ultrasonic energy is directed from the transmitting transducer downward to the surface of sewage in the manhole, and then, as an echo, the burst signal travels back up to the transducer functioning as a receiver. The transit time is detected to provide an indication of distance down to the level of the sewage.

Ideally, one would simply employ a manhole type ultrasonic measurement device for "in-pipe" measurements and thus overcome the problem described above. However, this simply will not work. First, existing equipment is not configured to fit into and function within a pipe. More importantly, however, it has been found that existing equipment simply will not make accurate measurements within a range wherein liquid levels are within a few inches of a receiving transducer. This difficulty arises from the fact that sonic energy directly received by a receiving transducer from a transmitting transducer tends to ring for some period of time after the transmitted pulse. Thus, there occurs a period immediately after the transmitted pulse when the effect of the transmitted pulse tends to mask and interfere with the detection of short range echoes returning during this interference period. Since a great many in-pipe measurements are to be made in relatively small sewage pipes, e.g., down to as little as eight inches, it is to be appreciated that several inches are lopped off of the short end of the range of measurement, and thus that such an approach is not feasible.

Another problem that often arises in sewage level measurement by ultrasonic means is that not infrequently echo signals will not follow a desired vertical path but will be deflected. Thus, for example, an echo may ricochet off the side wall of a pipe on its return travel to a receiving transducer. Alternately, the echo signal may, in its errant path, miss the receiving transducer and follow a path which involves multiple passes across the pipe before being received by the receiving transducer. Of course, in all cases where there is not a single echo and a direct pass back to the receiving transducer, an erroneous measurement of liquid level will occur.

With the foregoing in mind, it is the object of this invention to provide an improved flow monitoring system employing ultrasonic type liquid level measurements wherein the problem of short range measurements is overcome and wherein bad range signals are detected and ignored and, in general, a greater accuracy of measurement is achieved.

DISCLOSURE OF THE INVENTION

In accordance with this invention, an ultrasonic transducer assembly, employing at least one or a plurality of closely spaced ultrasonic transducer pairs, is positioned in the top of a pipe, preferably and typically back a distance from the exiting end of the pipe a distance equal to at least the diameter of the pipe. The transducers are oriented to direct sonic or ultrasonic energy downward to thus provide a vertical acoustic energy path from a transducer down to the surface of a liquid and then back to a transducer. As an example, a transducer is pulsed with a brief burst, for example, two to five cycles of ultrasonic energy, and this burst of energy moves downward until it strikes the surface of the sewage, and then is reflected upward; and, assuming that it is not deflected by the surface of the sewage, the echo will move upward to a selected one of the transducers. Its elapsed time of travel is then measured, and this measurement is provided as a signal for the determination of liquid level in the pipe.

As a feature of this invention, the problem of response to short range echoes is overcome by reducing the level of response of signal circuitry during the immediate period of the transmitted pulse and just thereafter. Subsequently, the response tapers upward (or attenuates downward) as a function of time, with the duration of the taper and response simply being such as to necessarily effect the response for a fairly short duration after a transmitted pulse. Typically, the period of concern would be that covering a distance range of up to five inches.

As a distinct feature of this invention, the desired variable response is accomplished by generating a ramp or exponential attenuating waveform signal, which signal is triggered "on" at the time of a transmitted pulse. The signal then decays for a selected period between anticipated transmissions. The signal is used as a subtractive signal against the output of the receiving transducers, and thus, in effect, it decreases the amplitude of responsiveness of the circuitry during transmission periods when very short echoes would be received, and the signal returns the system to increased responsiveness for longer distance signals where the problem described is not present and wherein greater signal sensitivity is desired.

As still a further feature of this invention, a plurality (e.g., 50) of ultrasonic measurement samples is taken sequentially over a very brief period, for example, 10 milliseconds, and these samples are compared both with a fixed maximum standard and with each other. Deviant signals are discarded. Samples remaining are averaged to provide an extremely accurate indication of level, and thereby depth, of liquid in the pipe, and this indication is used to compute liquid flow through the pipe.

BRIEF DESCRIPTION OF THE DRAWINGS

FIG. 1 is a schematic illustration of the position of ultrasonic transducers and a temperature sensor in a pipe to be monitored.

FIG. 2 is an electrical schematic block diagram of the system.

DETAILED DESCRIPTION OF THE DRAWINGS

Figure 3:
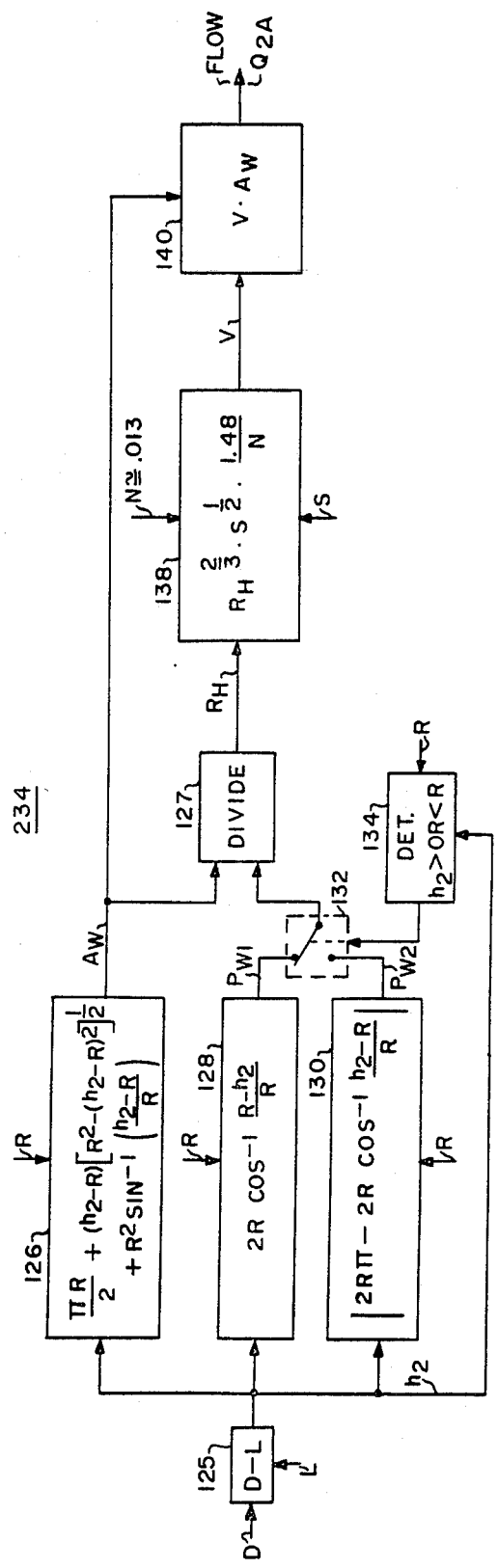
FIG. 3 is an electrical schematic block diagram of the flow computer of the system.

Referring to the drawings, a transducer assembly 200 of monitor 202 consists of four conventional ultrasonic transducers, each being capable of either emitting acoustic signals responsive to an electrical input to that signal, or responsive to the receipt of an acoustic signal to provide an electrical output representative of the received signal. As shown in FIG. 1, the transducer assembly is mounted on the roof of a sewer pipe 204 and is separated by a layer or layers of acoustic insulation 205 (FIG. 2) to produce attenuation of direct signal transmission as between them by a factor of at least 10. The transducer assembly is thus positioned to direct a signal downward against liquid surface 206, from which the signal would then be returned as an echo to transducer assembly 200. Transducer assembly 200 is positioned back in pipe 204 a distance equal to at least the diameter of pipe 204 from the exit end of the pipe.

Temperature sensor 201 is also positioned in pipe 204, and it provides a signal through common terminal X to temperature compensator 203, a multiplier which multiples averaged elapsed time signals by a factor which corrects for the known variation in sound velocity in air with a change in temperature. This factor is equal to $(331.5 + 0.605(T° C.)/331.5)$, where T° C. is the pipe air temperature in degrees Centigrade. Temperature compensator 203 receives averaged samples from average unit 205, compensates them for temperature, and provides them to storage unit 207, as will be further explained.

Transmitter exitation device 208, typically an electrical oscillator, provides an electrical output signal of, for example, 40 KHz. This signal is fed to a transmit multiplexer (MUX) 210 which, responsive to a control signal from controller 212 identifying a particular one of transducers A, B, C, and D of transducer assembly 200, supplies the exitation signal individually to the transducers in a selected sequence. Each signal is timed by controller 212 to provide a burst signal of a selected length, e.g., 0.012 to 0.5 millisecond, and each containing 1 to 20 cycles of a 40 KHz signal. The operation of controller 212 is initiated "on" periodically by timer 214 to commence each sequence of operation, for example, each 15 minutes; or it is operated by means of a remote signal coupled through telephone line 216 and local input-output terminal 220 from input-output terminal 218 at a remote location.

Controller 212 is a logic device, such as examplified by Texas Instruments Microcontroller, No. SPB0400, it being connected in circuit in a conventional manner in accordance with the functions for it as hereinafter described. Basically, it is a rather simple logic unit which is operated "on," senses a condition to see whether it is to proceed, then proceeds to sequentially operate multiplexers, and then, depending upon signal information provided it, it repeats certain operations until instructed to halt.

In addition to directing transmit multiplexer 210, sequentially as described, controller 212 coordinately directs receive multiplexer 222 to couple outputs of discrete transducers to signal receive circuitry, the first element of which is band pass filter 224. Band pass filter 224 is configured to pass the transmit frequency burst to generally attenuate signals higher or lower than this frequency.

Simultaneously with the transmit pulse, controller 212 provides a timing reference pulse to elapsed time calculator 226 and also provides an initiation pulse to ramp generator 228, which then generates a ramp signal (shown) which is provided to a summing device 230, and wherein the output of filter 224 and generator 228 are subtractively combined to provide a signal to envelope detector 232. Observing the waveform of the ramp signal, it will be noted that the effect of this combination is to provide an initial decrease in responsiveness of the circuit, followed by an increase in responsiveness with time following a transmitted pulse. This enables a relatively strong and short range echo signal to be detected without affecting the ability of the circuit to process long range and weaker signals. Without this provided effect, signal levels in the receive circuitry from the transmit signals and received short range signals, occurring very closely together, tend to block effective signal detection. This, in turn, prevents effective short range measurements. By virtue of the variable responsiveness, liquid level samples can be obtained to within approximately 0.5 inch from the transducer, and thus making it feasible to provide in-pipe liquid level detection.

Envelope detector 232 simply demodulates the output of summing device 230 to provide a signal envelope of the transmitted signal. It has been found that this envelope has a rather gradual rise to peak and then falls off to essentially "0" at approximately the same slope. Envelope detector 232 includes a peak detector, and its detected peak signal is fed to elapsed time calculator 226 which is a timer which is turned "on" by the initial timing pulse from controller 212 coincident with a transmitted pulse, and turned "off" by the detection of a high point on envelope detector 232. Knowing the length of the transmitted pulse and time position of its peak, like time points on transmitted and echo pulses can be determined, and thus precise signal transit times determined. Elapsed time calculator 226 is preset to indicate one-half of the length of elapsed time; and since the speed of sound in air is a constant (subject to compensation for temperature as described above), the output of calculator 226 is representative of the distance from a transducer to surface 206. The distance from the top of pipe 204 to the active area of the transducers is constant and compensated for by a like reduction in valve D of the diameter of pipe 204 as applied to difference unit 125 (FIG. 3). In the illustrated system, quantities are processed in terms of distance down to surface 206 and provided in that form finally to flow computer 234 (FIG. 3), which translates them into liquid heights $h_2$ by subtracting measured quantities from the diameter of the pipe (as amended).

Liquid level data is significant in the determination of flow only so long as the pipe from which flow is being measured is not full. Of course, when the pipe becomes full, there can no longer be a liquid level variable. Thus, it is necessary to determine when the pipe fills; and in accordance with this invention, the full or surcharge state is detected by surcharge detector 236, which monitors the amplitude of the echo signals as received from envelope detector 232. It has been observed that when the transducers are fully immersed in liquid, there is a fairly significant increase in signal strength from a received signal, and thus surcharge detector 236 is a signal amplitude detector, adapted to provide an output to controller 212 whenever a surcharge condition exists. Responsive to this output, controller 212 is adapted to cease taking samples, or not to take samples until the surcharge condition recedes.

To consider operation of the system, assume that controller 212 is programmed to cause sequential operation of transducer A and transducer B as a first transmit-receive pair, transducer C and transducer D as a second transmit-receive pair, transducer A and transducer C as a third transmit-receive pair, and transducer B and transducer D as a fourth transmit-receive pair. Thus, when triggered "on" by timer 214, controller 212 directs the turn-on of each of these pairs in the indicated sequence, which sequence is repeated until the program of data taking dictated by controller 212 is completed.

Assume now that controller 212 has been turned "on," and thus controller 212 signals multiplexer 210 to pass a first signal burst from transmitter exitation device 208 to transducer A. The signal burst is then radiated in the form of sonic energy down through the air in pipe 204. Simultaneously, with the initiation of this pulse of energy, controller 212 triggers "on" elapsed time calculator 226 to turn its counter "on", which commences counting time. As described above, elapsed time calculator 226 provides an output representative of one-half of the elapsed time between the transmission and receipt of an echo in order to provide a direct indication of a one-way travel signal. Simultaneous with the described operation of multiplexer 210, controller 212 operates multiplexer 222 to cause transducer B to operate as a receive transducer by coupling it to filter 224. Controller 212 also operates "on" pass counter 238, which is adapted to receive the output time sample of elapsed time calculator 226.

Pass counter 238 is a digital register having these features. It provides an enable input to AND gate 254, a control incrementing input to attempt counter 241, and a control input to "first pass" flip-flop 240 each time it is operated "on" by controller 212. It has a logic input responsive to a "1" output from first pass flip-flop 240, causing pass counter 238 to pass its registered value, received from elapsed time calculator 226, to seed register 242 and to sum register 256. Also responsive to the "1" output from flip-flop 240, pass counter 238 provides an incrementing signal to "number of good" counter 258.

In the event that first pass counter 238 receives a "0" output from first pass flip-flop 240, which indicates that pass counter 238 is not being operated subsequent to a first time, pass counter 238 provides an operating input signal to pipe diameter detector 244.

Pass counter 238 includes logic elements necessary to perform the foregoing functions, which logic elements clearly are selectable from the recital of these functions.

Before proceeding with any further operation, controller 212 tests finish line 246 to determine if operation should be halted by virtue of the finish of a sequence of measurements, this being indicated by one of two criteria employed by the system. The first one is that there has occurred 50 transmissions wherein there may have been less than eight, or even zero, good samples; and the second one is that there has been obtained eight good samples, as will be further described. A finish condition is indicated by a "1" on finish line 246.

Generation of a signal on finish line 246 is determined alternately as follows. In one instance, a "51" count from atempt counter 241 is compared in comparator 248 with a 51 count, and it provides a "1" output to OR gate 250, and thus to finish line 246. Otherwise, it provides a "0" output to finish line 246. In accordance with the second criteria, coincidence between a signal indicating eight good samples from decoder 252 is provided to AND gate 254 together with a count signal from pass counter 238. This causes a "1" output of AND gate 254 to be provided to OR gate 250, which provides a "1" to finish line 246. Otherwise, this last described circuitry provides a "0" to finish line 246.

As only one attempt thus far has been made, we must assume that the output on finish line 246 is a "0", indicating that neither of the two finish conditions has been reached. Thus, to continue, the output of elapsed time calculator 226, providing a first elapsed time sample, is fed to pass counter 238. Responsively, pass counter 238 provides an incrementing count to attempt counter 241 to operate it to a "1" count, and it checks to see if this was the first sample taken, as described above. Pass counter 238 will be informed in this respect by virtue of it providing a count output to first pass flip-flop 240, which in turn provides its output back to pass counter 238. Assuming a first trigger situation in flip-flop 240, as described, its output to pass counter 238 is set to a "1". Accordingly, and in such case, pass counter 238 does these four things. First, it resets the flip-flop to a "0"; second, it loads the elapsed time from time calculator 226 into seed register 242 and also supplies this value to sum register 256; third, the "number of good" counter 258 is incremented; and finally, pass counter 238 indicates to controller 212 the completion of this pass, enabling controller 212 to proceed to order a second sample to be taken. If the output of flip-flop 240 had been "0", it would have activated pipe diameter detector 244. Since, as described, this was only the first attempt of a sample being taken, this latter condition would not be indicated.

Seed register 242 is simply a digital register which holds one sample until it is supplied a second one, and the second one replaces the first one. Sum register 256 is also a simple digital register adapted to register the sum of inputs provided it. In other words, it is simply a digital adder. "Number of good" counter 258 is simply a digital counter triggerable from either pass counter 238 or new seed initializer 264 and which holds a count equal to the number of good samples taken, as will be further explained. Decoder 252 decodes counter 258 and has three output lines, one of which provides a "true" output when the count or output is equal to "0". The second output becomes "true" when the count is in the range of 1–7. The third output becomes "true" when a count of 8 is registered.

To continue the description of operation, controller 212 now operates transmit multiplexer 210 a second time to provide exitation of transducer C and to trigger "on," again, elapsed time calculator 226 and to operate receive multiplexer 222, which in turn enables a returning echo to be received by transducer D and supplied filter 224. Pass counter 238 is operated as described above, and it increments attempt counter 241 to a count of 2. At this time, it is clear that first pass flip-flop 240 would indicate to pass counter 238 a "0", thus the sample provided pass counter 238 from elapsed time calculator 226 is not provided to seed register 242; and instead, by virtue of the "0" output of flip-flop 240, pass counter 238 operates "on" pipe diameter detector 244. Pipe diameter detector 244 is also fed a reference input representative of the diameter of pipe 204 (less, where significant, the depth of a transducer below the top of the pipe) in terms of signal transit time. Upon being operated "on", pipe diameter detector 244 accepts an elapsed time sample from elapsed time calculator 226, which thus is the second sample taken thus far in the process, and detector 244 compares this second sample value with the reference diameter input. If the elapsed time representative of distance is greater than the reference input, it is clear that a bad sample has been received as, of course, transit time should never exceed that represented by pipe diameter. In the event of excessive time signals, pipe diameter detector 244 sends a signal to controller 212 to prevent further processing this signal by simply indicating to controller 212 that it take a new sample. Detector 244 is simply a difference circuit which is enabled by a control input.

In the event that the second sample is within the limits of the diameter of pipe 204, pipe diameter detector 244 triggers "on" "too long" comparator 260, which then accepts the first sample which is in seed register 242, and a second sample which is in elapsed time calculator 226 and subtracts the latter from the former. A plus margin allowance for this difference is provided as an input to "too long" comparator 260, for example, +1.0 inch. The difference signal and margin signals are subtracted; and if the difference exceeds the margin signal, the sample is rejected as too large and rejected as a bad sample, in which case comparator 260 signals controller 212 to take a new sample. As indicated by the description of functions, comparator 260 simply comprises two serially arranged difference circuits operated by an enable input and two logic outputs which function as described.

If the second sample in elapsed time calculator 226 is within the criteria of "too long" comparator 260, and thus possibly a good sample, comparator 260 triggers "about right" comparator 262, and this comparator compares the second sample from elapsed time calculator 226 with the first sample from seed register 242 by subtracting the two and then compares the difference with a minus margin input, for example, −1.0 inch, to determine whether the sample is significantly smaller than the first sample. If the margin is not exceeded, the second sample is deemed "about right". In such case, an output of "about right" comparator 262 triggers "on" sum register 256, and the second sample is added to sum register 256, and thus there is provided a sum of the two good samples taken thus far. Second, "about right" comparator 262 increments by 1 "number of good" counter 258, which then advances to a count of 2. Third, comparator 262 signals controller 212 to take a new sample. Comparator 262 includes, as does comparator 260, two serially arranged difference circuits, logic outputs to sum register 256, and number of good counter 258 to signal a good signal and a logic output to controller 212 to signal it to take a new sample upon the occurrence of a "good" sample.

If, however, the second sample is smaller than the first sample by more than the selected margin, "about right" comparator 262 supplies the second sample to new seed initializer 264, which then couples the second sample from elapsed time calculator 226 as a new sample value to seed register 242 and to sum register 256, and this transfer is sensed by "number of good" counter 258, which is reset by this action. New seed initializer 264 then signals controller 212 to take a new sample.

The reason for action by new seed initializer 264 is that such a series of steps described indicates that the first sample taken is significantly larger than the last one, indicating that the first one was probably responsive to a multiple path echo, and thus a bad sample. By the process described, it was aborted.

The process of taking samples described will continue with repeated samples being taken consecutively by the transmitter-receiver pairs referred to above. In each instance, attempt counter 241 is incremented one step; if a good sample is determined, it is added to the sum of sum register 256 and "number of good" counter 258 incremented so that it carries in it the number of samples totalled in sum register 256.

In the event that "about right" comparator 262 indicates that a subsequent sample is significantly less than the sample in seed register 242, the new or subsequent sample is supplied to seed register 242, the value in sum register 256 is replaced by a single new sample value, and "number of good" counter 258 is reset by 1 by new seed initializer 264, as described.

By this process, samples will continue to be taken until one of two things occurs. Either eight good samples are summed in sum register 256, and this is indicated by the number of good samples in counter 258; or attempt counter 241 is operated 50 times, during which time there may have been either less than eight good samples or no good samples.

If eight good samples have occurred, this is indicated by "number of good" counter 258. This indication is decoded by decoder 252, which provides a responsive "true" input to AND gate 254. Accordingly, with the next sample taken, the attempt incrementing output of pass counter 238 is supplied to AND gate 254, and its output would become "true", and fed through OR gate 250 to finish line 246, thus indicating to controller 212 that the data taking program was completed. If eight good samples are not taken up to the time when attempt counter 241 is incremented the fifty-first time, its 51 count output is provided to comparator 248, a digital comparator, wherein it is compared with a fifty-first count provided as a reference input. This causes comparator 248 to provide a "true" or "1" output to OR gate 250, which then provides a "true" or "1" signal to controller 212 on finish line 246, signalling the completion of a sample taking program.

Assume next that eight good samples have been taken as indicated by decoder 252. On the next attempt count, and a signal from pass counter 238 to AND gate 254, there will be provided a "true" input to OR gate 266, which then triggers average unit 205 to cause the output of sum register 256 to be divided by the number of good counts, in this case, eight. This average sample will be fed by average unit 205 through temperature compensator. 203 to data storage unit 207, a digital memory, where it will be stored. Temperature compensator 203 multiplies the averaged sample value by a temperature compensation factor, as described above, which further enhances the accuracy of measurements.

If there had not been eight good samples taken, but a lesser number (1-7), decoder 252 would provide a "true" output, indicating this to AND gate 268. A second input to AND gate 268 is provided from compare circuit 248 when there have been 51 sample taking attempts signalled by attempt counter 241 to comparator circuit 248. With these two "true" inputs to AND gate 268, the output of AND gate 268 will become "true", and this signal fed to OR gate 266, which would, again, trigger average unit 205 to cause the output of sum register 256 to be divided by the "number of good" counts from counter 258 and the results provided through temperature compensator 203 to data storage unit 207.

Assume now that by the end of 50 attempts there were simply no good samples obtained, and thus there would be a "0" count in "number of good" counter 258. This output is decoded by decoder 252 and provided as a "true" input to AND gate 270. Then, with the next attempt at taking a sample and a count input being applied to attempt counter 241, comparator 248 provides a "true" output which is supplied to a second input of AND gate 270, and which then causes AND gate 270 to become "true" and provide a signal to error signal generator 272, and it provides an arbitrary signal value to data storage unit 207 of a character which would ultimately signal to flow computer 234 that no good outputs had been obtained.

Typically, timer 214 would have initiated controller 212 to take liquid level samples each 15 minutes or so, and thus there would be stored in data storage unit or memory 207 the average liquid level value for each of the transducers for each of these timed periods, identified by a real time signal obtained, for example, from controller 212 and stored with each average liquid level value, or only with the first of a sequence of averaged liquid level samples which are taken at a fixed rate (e.g., every 15 minutes). This data being typically stored at a measurement site is made available to a conventional input-output digital telephone terminal at the measurement site, and then is transmitted via a telephone line 216 and a like input-output digital telephone terminal 218 at the central computer site of flow computer 234. In addition to the taking of samples being determined by timer 214, input-output terminal 218 at the central computing site is adapted to signal input-output terminal 220 to turn "on" controller 212 in a like fashion to that effected by timer 214. Such would be a conventional communications function for such a combination.

Input-output terminal 220 at the central computing site will transfer the data in data storage unit 207 to memory 274 where, under the control of flow computer 234, data would be extracted from memory 274 and employed in flow computer 234 to make flow computations.

Flow computer 234 (FIG. 3) obtains a sample from memory 274, representing a signal L, the distance from the top of pipe 204 to the liquid level surface. Signal L is subtracted in difference unit 125 from the signal D, representing the diameter of pipe 204 to provide a value $h_2$, representing the height of liquid in pipe 204. Computation unit 126 receives this value $h_2$ and the radius R of pipe 204 and performs the function shown to obtain an output $A_W$, wetted area, of the pipe.

Next, the quantity $R_H$, hydraulic radius, is determined by divider 127, which divides the cross section of the wetted area $A_W$ by a wetted pipe perimeter $P_W$. Depending upon whether or not pipe 204 is more or less half full, that is, the water level is greater than or less than the radius of the pipe, output $P_{W1}$ from computer 128, or $P_{W2}$ from computer 130, would be provided through selector 132 to divider 127. This selection is controlled by half pipe detector 134, which receives the liquid height signal $h_2$ and an input R equal to the radius of the pipe and provides a selected output to divider 127 under the criteria stated. Computers 126, 128, and 130 perform the computations indicated on the blocks, receiving also radius dimension inputs for the pipe in question and the liquid height $h_2$.

Next, computing element 138 solves the problem shown in the box representative of that element, and whereby $R_H^{2/3}$ is multiplied by $S^{\frac{1}{2}}$ times 1.48 and divided by a constant of an approximate value of 0.013. The result is an indication of velocity of flow V in feet per second. S is representative of the local slope of pipe 204 in feet per thousand.

Next, velocity in feet per second is multiplied by multiplier 140 by the wetted area $A_W$ to provide an output $Q_{24}$, representative of volume of flow in million gallons per day.

While the circuitry illustrated in block diagram form indicates that discrete functions would be performed by discrete circuits, it is to be appreciated that the circuitry may be combined in multi-function integrated circuits, or one or more microprocessors which are particularly wired in accordance with the performance of the discrete functions described.

I claim:
1. A flow monitoring system comprising:
ultrasonic transducer means positionable in the top region of a sewer pipe for transmitting and receiving acoustic energy along a generally vertical path;
signal means coupled to said transducer means and responsive to an input control signal for energizing said transducer means in repetitive bursts of a selected duration of ultrasonic frequency signals to thereby produce bursts of ultrasonic acoustic energy which move downward in a said pipe;
control means for providing system control signals including said control signal to said transducer means;
receiver means comprising:
filter means coupled to receive signals received by said transducer means and for passing signals corresponding to signal energy proximate to the frequency of the transmitted ultrasonic signals, and
envelope detection means responsive to the output of said filter means for providing a burst contour signal;
signal timing means responsive to said envelope detection means and a signal from said signal means corresponding in time to a transmitted signal burst from said transducer means for providing an output signal varying as a function of the period between the transmission of a signal burst and the reception of a signal burst, and for providing an output representative of the distance between said transducer means and the surface of a fluid flowing through said pipe;

comparator means for comparing a series of outputs from said timing means, each being a sample representative of a said distance, with the preselected values and for providing signal outputs in a form of discrete timing signal samples which are of a distance value no greater than a distance equal to the diameter of said pipe and do not represent a sample, representative of a said distance, which differs in value from another of the series of samples by more than selected differences;

averaging means responsive to the output of said comparator means for averaging signal samples from said comparator means, and thereby providing the average distance as reflected by said series of samples; and computation means responsive to said averaging means for computing flow through said pipe.

2. A flow monitoring system as set forth in claim 1 wherein said ultrasonic transducer means comprises:

a plurality of ultrasonic transducers including a transmit transducer and a receive transducer, said Transmit transducer is coupled to a transmit means and said receive transducer is coupled to said receiver means at least during discrete portions of a transmit-receive cycle;

acoustical insulation means positioned between said transducers for reducing the direct transmission of signals between a transmit transducer and a receive transducer;

said receiver means includes signal means for discriminating between the transmitted signal as directly received by a receive transducer and as received as an echo by substantially reducing the level of a signal representative of a directly received transmitted signal as it otherwise would appear at said envelope detection means.

3. A flow monitoring system as set forth in claim 2 wherein said signal means includes means for varying the level of signal response of said receiver means directly as a function of time following the initiation of the transmission of a said burst of ultrasonic acoustic energy.

4. A flow monitoring system as set forth in claim 3 further comprising surcharge detection means, in turn comprising amplitude detection means responsive to a burst contour signal from said receiver means, for providing an electrical output to said control means, as an operations halt signal, when the amplitude of said last-named signal exceeds a selected amplitude.

5. A flow monitoring system as set forth in claim 4 further comprising:

temperature sensing means positioned in said pipe for providing an electrical signal representative of temperature of air in said pipe; and temperature compensation means responsive to said signal from said averaging means and said signal from said temperature sensing means for adjusting said signal from said averaging means to said computation means in terms of the variation in velocity in sound in air as a function of temperature, whereby said signal to said computation means is corrected for temperature.

6. A flow monitoring system as set forth in claim 5 wherein said comparator means comprises means for comparing each of the series of samples from said timing means which follows at least one previous sample with a prior sample, and each prior sample being either the first output of said signal timing means of said series, or a sample which is of a value tested by said comparator means and found to be representative of a value no greater than the diameter of said pipe and of a value less than a multiple pass sample.

7. A flow monitoring system as set forth in claim 6 wherein said comparator means comprises:

pipe diameter detection means responsive to a sample following at least one sample of a series of samples for providing a signal indicative of the received current sample being within the limits of the diameter of said pipe; and proximate comparison means responsive to a said signal from said pipe diameter detection means for comparing a current sample with a said prior sample and providing the current sample as an output of said comparator means when the current sample is within a selected ± value margin of said prior signal.

8. A flow monitoring system as set forth in claim 7 wherein there are four said transducers, any two of which may comprise a transmit-receive combination.

* * * * *